(12) United States Patent
Monne et al.

(10) Patent No.: US 7,689,424 B2
(45) Date of Patent: Mar. 30, 2010

(54) DISTRIBUTED SPEECH RECOGNITION METHOD

(75) Inventors: Jean Monne, Perros Guirec (FR); Jean-Pierre Petit, Minihy Treguier (FR); Patrick Brisard, Chatillon (FR)

(73) Assignee: France Telecom, Paris (FR)

( * ) Notice: Subject to any disclaimer, the term of this patent is extended or adjusted under 35 U.S.C. 154(b) by 1171 days.

(21) Appl. No.: 10/550,971

(22) PCT Filed: Mar. 8, 2004

(86) PCT No.: PCT/FR2004/000547

§ 371 (c)(1),
(2), (4) Date: Sep. 26, 2005

(87) PCT Pub. No.: WO2004/088637

PCT Pub. Date: Oct. 14, 2004

(65) Prior Publication Data

US 2007/0061147 A1 Mar. 15, 2007

(30) Foreign Application Priority Data

Mar. 25, 2003 (FR) .................................. 03 03614

(51) Int. Cl.
*G10L 21/00* (2006.01)
*G10L 15/00* (2006.01)

(52) U.S. Cl. .................... 704/270.1; 704/231

(58) Field of Classification Search ............. None
See application file for complete search history.

(56) References Cited

U.S. PATENT DOCUMENTS

| 6,122,613 A | 9/2000 | Baker | 704/235 |
|---|---|---|---|
| 6,487,534 B1 | 11/2002 | Thelen et al. | 704/270 |
| 6,823,306 B2* | 11/2004 | Reding et al. | 704/244 |
| 6,898,567 B2* | 5/2005 | Balasuriya | 704/231 |
| 7,197,331 B2* | 3/2007 | Anastasakos et al. | 455/557 |
| 2003/0004720 A1 | 1/2003 | Garudadri et al. | 704/247 |
| 2004/0162731 A1* | 8/2004 | Yamada et al. | 704/270.1 |

OTHER PUBLICATIONS

International search report dated Jul. 28, 2004 with English translation (4 pgs).

* cited by examiner

*Primary Examiner*—Matthew J Sked
(74) *Attorney, Agent, or Firm*—Drinker Biddle & Reath LLP

(57) ABSTRACT

This invention relates to a distributed speech recognition method comprising at least one user terminal and at least one server which can communicate with each other by means of a telecommunication network. The inventive method comprises the following steps consisting in: at the user terminal, attempting to associate a saved form with the signal to be recognized and, independently of said step, transmitting a signal to the server, indicating the signal to be recognized; and, at the server, attempting to associate a saved form with the signal received.

13 Claims, 1 Drawing Sheet

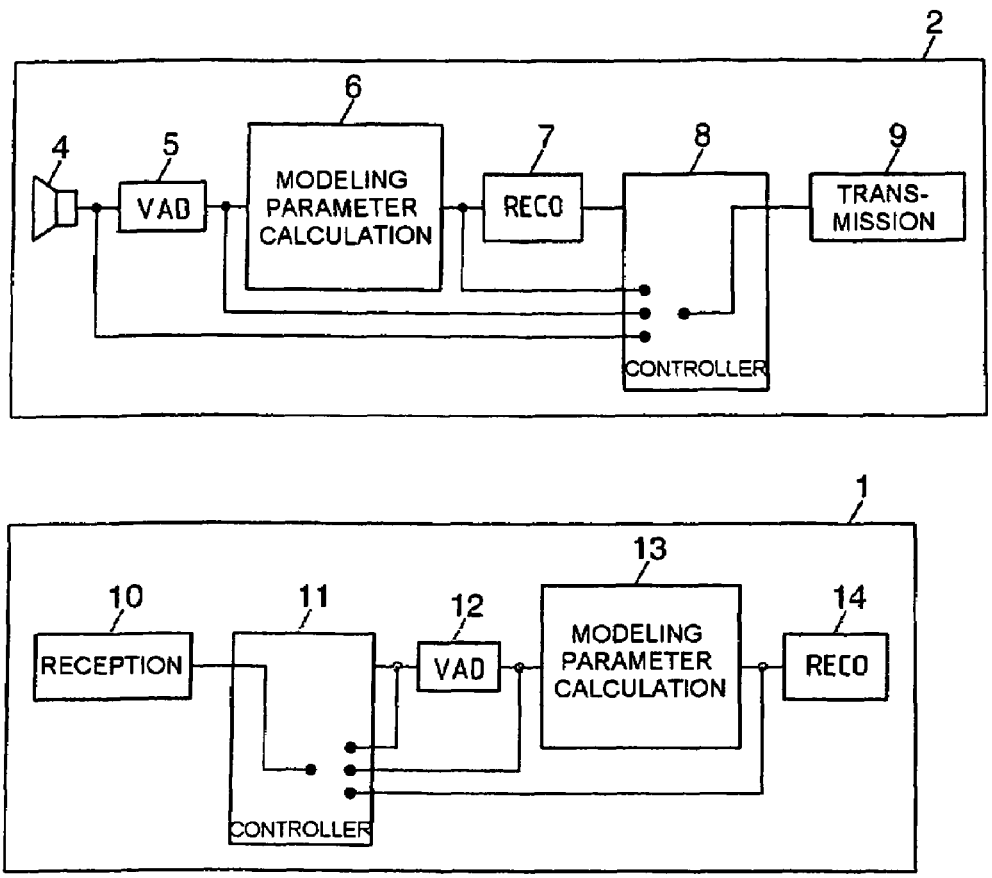
FIG. Single FIG.

DISTRIBUTED SPEECH RECOGNITION METHOD

RELATED APPLICATIONS

The subject application is a U.S. National Stage application that claims the priority of International Application No. PCT/FR2004/00547, filed on 8 Mar. 2004, which claims the priority of French National Application No. 03 03614, filed on 25 Mar. 2003.

FIELD OF INVENTION

The present invention relates to the field of the vocal control of applications, practiced on user terminals, thanks to the implementation of speech recognition means. The user terminals in question are all devices with a means of sensing speech, commonly a microphone, having capabilities for processing this sound and being connected to one or more servers via a transmission channel. These can, for example, be control or remote control devices used in home office applications, in automobiles (car radio or other vehicle function control), in PCs or telephones. The range of applications concerned is essentially that where the user controls an action, requests information or wants to interact remotely using a voice command. The use of voice commands does not exclude the existence within the user terminal of other activation means (multi-modal system), and the return of information, system states or responses may also be effected in visual, audio, olfactory or any other humanly perceptible combined form.

BACKGROUND OF THE INVENTION

Generally speaking, the means for effecting speech recognition comprise means for obtaining an audio signal, means for acoustic analysis which extract modeling parameters and, finally, recognition means that compare these extracted modeling parameters with models and suggest the form stored in the models that can be associated with the signal in the most probable manner. Optionally, voice activation detection (VAD) means may be used. These provide the detection of the sequences corresponding to speech which are required to be recognized. They extract segments of speech from the audio signal at the input, outside of the periods without voice activity, which will subsequently be processed by the modeling parameter extraction means.

More particularly, the invention relates to the interactions between the three speech recognition modes: onboard, centralized and distributed.

In an on-board speech recognition mode, the whole of the means for effecting the speech recognition are located within the user terminal. The limitations of this mode of recognition are therefore associated notably with the power of the on-board processors and with the memory available for storing the speech recognition models. On the other hand, this mode allows autonomous operation, without connection to a server, and in this respect is reliant on a substantial development associated with the reduction of the cost of processing capacity.

In a centralized speech recognition mode, the whole speech recognition procedure and the recognition models are located and are executed on a computer, generally called vocal server, accessible by the user terminal. The terminal simply transmits a speech signal to the server. This method is used notably in the applications offered by telecommunications operators. A basic terminal can thus have access to sophisticated voice-activated services. Many types of speech recognition (robust, flexible, very large vocabulary, dynamic vocabulary, continuous speech, mono- or multi-speaker, several languages, etc.) may be implemented within a speech recognition server. Indeed, centralized computer systems have large and increasing model storage capacities, working memory sizes and computational powers.

In a distributed speech recognition mode, the acoustic analysis means are onboard within the user terminal, the recognition means being at the server. In this distributed mode, a noise-filtering function associated with the modeling parameter extraction means can be advantageously effected at the source. Only the modeling parameters are transmitted allowing a substantial gain in transmission rate, which is particularly advantageous for multi-modal applications. In addition, the signal to be recognized can be better protected from transmission errors. Optionally, the voice activation detector (VAD) can also be onboard so as to only transmit the modeling parameters during the speech sequences, which has the advantage of significantly reducing the active transmission duration. Distributed speech recognition also allows signals for speech and data, notably text, images and videos, to be carried on the same transmission channel. The transmission network can, for example, be of the IP, GPRS, WLAN or Ethernet type. This mode also allows the user to benefit from protection and correction procedures against the loss of packets forming the signal transmitted to the server. However, it requires the availability of data transmission channels, with a strict transmission protocol.

OBJECTS OF THE INVENTION

The invention proposes a speech recognition system comprising user terminals and servers combining the various functions offered by on-board, centralized and distributed speech recognition modes, in order to provide a system that is optimal in efficiency, comfort and ergonomy for the users of multi-modal services where voice-activated control is used.

The patent U.S. Pat. No. 6,487,534-B1 describes a distributed speech recognition system comprising a user terminal having means for detecting voice activation, means for extracting modeling parameters and recognition means. This system additionally comprises a server also having recognition means. The method described is consists in carrying out a first recognition phase at the user terminal. Then, depending on the results of this first phase, the modeling parameters calculated at the terminal can be sent to the server, so as notably to determine this time, by way of the recognition means in the server, a form that is stored in the models of the latter and is associated with the signal sent.

The aim of the system described in the document cited is to reduce the load at the server. However, the result of this is that the recognition is effected, at best, after the time required for the first phase in the terminal. When a second phase must happen, the total recognition time is equal to the recognition time of the first phase added to that of the second phase.

One subject of the present invention is a method that aims to optimize the time required for the speech recognition, and therefore for the performance of the action requested by the user.

SUMMARY OF THE INVENTION

According to a first aspect, the invention proposes a distributed speech recognition method, comprising at least one user terminal and at least one server, capable of communicating with one another via a telecommunications network, according to which, at the user terminal, at least the following steps are performed:

obtain an audio signal to be recognized; and calculate modeling parameters for the audio signal to be recognized; and attempt to associate a stored form with the modeling parameters; and independently of the step for attempting to associate a stored form, transmit a signal indicating the audio signal to be recognized to the server;

and, at the server, at least the following steps are performed:

receive the signal transmitted by the user terminal;

attempt to associate a stored form with the received signal.

A method according to the invention allows the cumulation of the processing time at the terminal and the processing time at the server to be avoided, and thus to reduce the time for responding to the user request.

It also allows the advantages of the characteristics of the recognition means available at the terminal and at the server, respectively, to be exploited, notably when the signal to be recognized is of undefined nature, in order to determine the response to be effected as quickly as possible.

In preferred embodiments, the signal transmitted by the user terminal to the server is selected from at least the audio signal to be recognized and a signal indicating the modeling parameters. Then, if the received signal is of the audio type, the server calculates modeling parameters for the received audio signal and attempts to associate a stored form with the modeling parameters of the received audio signal. If the received signal indicates modeling parameters, the server attempts to associate a stored form with said modeling parameters.

The choice of the signal transmitted—either the audio signal (compressed or otherwise) or the signal delivered by the means for calculating the modeling parameters of the terminal—can be defined by the type of applications in progress, by the state of the network, or following a coordinated action between respective control means of the terminal and of the server.

Advantageously, obtaining the signal to be recognized at the terminal comprises a voice activation detection applied to an original audio signal in order to produce the audio signal to be recognized by removing periods without voice activity from the original signal. The signal to be transmitted will therefore be selected from between this audio signal devoid of periods without voice activity and the signal indicating modeling parameters.

In one embodiment of the method according to the invention, the transmitted signal is selected a signal from amongst at least the original audio signal, the audio signal representing the original signal devoid of periods without voice activity after voice detection and the signal indicating the modeling parameters.

Advantageously, if the received signal is an audio signal devoid of periods without voice activity, the server calculates modeling parameters for the received signal and attempts to associate a stored form with the modeling parameters of the received audio signal. When the received signal is a signal of the audio type, but on which no voice activation detection has been performed, the server performs a voice activation detection applied to the received audio signal in order to produce an audio signal to be recognized by removing the periods without voice activity from the original signal. Then, it calculates modeling parameters for the audio signal to be recognized. Lastly, it attempts to associate a stored form with the modeling parameters.

Advantageously, the associated stored form determined at the terminal is chosen, when this associated form exists. The associated stored form determined first is chosen. Or again, the associated stored form judged best according to a defined criterion (for example, probability of true match) is chosen.

According to a second aspect, the invention proposes a user terminal for implementing the distributed speech recognition method described hereinabove.

According to a third aspect, the invention proposes a server for implementing the distributed speech recognition method described hereinabove.

In one preferred embodiment, at least some of the means for performing the recognition processing at the terminal (parameter extraction means or recognition means) have been downloaded via the telecommunications network. They may, for example, be downloaded by the server.

BRIEF DESCRIPTION OF THE DRAWINGS

Other features and advantages of the invention will further become apparent upon reading the description that follows. The latter is purely illustrative and must be read with reference to the appended drawings in which the single FIGURE is a block diagram showing an example of user terminal and an example of server according to the invention.

DETAILED DESCRIPTION

The system shown in the single FIGURE comprises a server 1 and a user terminal 2, which communicate with one another via a network (not shown) having channels for the transmission of voice signals and channels for the transmission of data signals.

The terminal 2 comprises a microphone 4 which collects the speech to be recognized from a user in the form of an audio signal. The terminal 2 also comprises modules 5, 6, 7. The voice activation detector module VAD 5 provides the detection of the sequences corresponding to speech and which are required to be recognized. This module 5 is for example designed for fast detection of command words. The module 6 performs an acoustic analysis in a manner known per se: it calculates modeling parameters, while at the same time providing a noise-filtering function.

The module 7 executes a recognition algorithm of a known type, for example based on hidden Markov models with a reduced vocabulary. This recognition engine 7 can operate in mono-speaker mode and requires an initial learn phase for the voice of the user.

The terminal comprises a controller 8 designed to select one audio signal from amongst the audio signal at the output of the microphone 4, a signal representing the speech segments extracted by the voice activation detection means 5 and a signal indicating the modeling parameters 6.

The terminal additionally comprises an interface 9 for the transmission of the signal selected by the controller 8 over the network to the server.

The server 1 comprises a network interface 10 for receiving the signals addressed to it and a controller 11 that analyzes the received signal and then selectively directs it toward one server processing module from amongst several modules 12, 13, 14. The module 12 is a voice activation detector that detects segments corresponding to speech in a similar manner to the module 5. However, it can be different from the module 5 and, for example, be designed to quickly detect whole phrases. Its response time can therefore be different from the module 5. In the present example, its response time will be slower. The module 13 provides the calculation of modeling parameters in a similar manner to the calculation module 6 in the terminal. However, the calculation model may be different. The module 14 executes a recognition algorithm of a known type, for example based on hidden Markov models with any given size of vocabulary, for example greater than 100,000 words. This recognition engine 14 compares the parameters at the input with speech models that represent words or phrases, and determines the best associated form, taking into account syntax models that describe expected word chains, lexical models that dictate the various pronunciations of the words and acoustical models representative of pronounced sounds. These models are for example multi-speaker, capable of reliably recognizing speech independently of the speaker.

The controller 11 controls the VAD module 12, the parameter calculation module 13 and the recognition engine 14 such that:

a/ when the signal received by the network interface 10 is of the audio type and does not indicate speech segments obtained after voice activation detection, the voice activation detection module 12 is activated by addressing the received signal to them as input signal, then the speech segments extracted by the module 12 are addressed to the modeling parameter calculation module 13 as input parameters, then the parameters extracted by this module 13 are addressed to the recognition engine 14 as input parameters;

b/ when the signal received by the reception interface 10 indicates speech segments after voice activation detection, the modeling parameter calculation module 13 is activated by addressing the received signal to it as input signal, then the parameters extracted by this module 13 are addressed to the recognition engine 14 as input parameters;

c/ when the signal received by the reception interface 10 indicates modeling parameters, said indicated parameters are addressed to the recognition engine 14 as input parameters.

An application is now considered in which the user declares: "call Antony", where 'Antony' appears in the local directory. The corresponding audio signal obtained by the microphone 4 of the terminal is processed by the VAD module 5, which extracts speech segments from it that are in turn addressed to the module 6 which calculates modeling parameters. These parameters are subsequently addressed to the recognition engine 7 in order to associate a form taken from the local dictionary with them. In parallel, the controller 8 has selected a signal to be transmitted from amongst the original audio signal, an audio signal indicating the speech segments extracted from the original audio signal after voice activation detection and a signal indicating the modeling parameters. The selected signal is transmitted to the server by means of the transmission interface 9.

In the embodiment considered, the signal selected by the controller of the terminal 8 is the original audio signal, which has been sent toward the server as soon as it was acquired by the microphone 4.

The server receives the signal to be recognized sent by the terminal and processes it as indicated in a/ hereinabove.

The recognition process is thus carried out at both ends. The terminal determines, in a time T1, an associated form F1; the server determines another associated form F2 in a time T2, different from T1. One of the two forms is retained according to a selection criterion. The selection criterion may is, for example, the following: the form found the quickest is chosen as soon as it is found, without waiting for the determination of the other form. The local application process at the terminal then passes to the next application phase.

Then, the user declares: "search for the message from Josiane".

The response at the terminal is not consistent and results in a rejection after a time T1'. The recognition is performed in parallel at the server and ends, after a time T2', in the determination of an associated form, which will allow the message requested by the user to be played.

A recognition method according to the invention thus allows the advantages of the recognition systems at the terminal and at the server to be combined. The short words are quickly determined by the recognition engine 7 of the terminal and the more complex phrases are quickly recognized by the recognition engine 14 of the server. The better adapted the characteristics of the respective VADs, the more optimized will be the processing time, the VAD 5 of the terminal being for example designed to detect command words quickly and the VAD 12 of the server being designed to detect phrases quickly.

The terminal controller 8 determines the signal to be transmitted to the server for example as a function of control criteria. These criteria may for example be associated with the application in question, or with the loading issues of the various processing means at the terminal and at the server (the respective control means can cooperate), or again with issues of voice transmission channel or data transmission channel availability.

For example, for some terminals, the signal sent will systematically be a signal indicating modeling parameters. For other terminals, the signal sent will depend on the application in progress.

In one embodiment of the invention, in the case of problems of data channel availability or of the calculation module 6 of the terminal in question, the controller 8 is designed to transmit the audio signal (original or after VAD). This audio signal could be transmitted over the available voice signal transmission channels.

The manner of determining the form finally retained and that will be exploited in the continuation of the application, between an associated form supplied by the recognition module of the server and an associated form supplied by that of the terminal, can be carried out based on various criteria that may vary from one terminal to another, but also from one application to another or from one given context to another.

These criteria can, for example, give priority to the recognition carried out at the terminal, or to the associated form having the highest match probability, or again to the form determined the quickest. These selection criteria can be integrated, for example, within the controllers 8, 11 of the terminal or of the server.

The server according to the invention is also capable of performing speech recognition on a signal transmitted by a terminal which has neither means for extracting modeling parameters nor recognition means (or whose extraction and recognition means are inactive), but could have VAD.

In one embodiment, the recognition engine 7 of the terminal 2 is an executable program downloaded, for example, from the server via conventional data transfer means.

Advantageously, for a given application of the terminal 2, recognition models in the terminal may be downloaded or updated during a dedicated session connected to the network.

Other software resources usable for speech recognition may also be downloaded from the server 1, such as the module 6 for modeling parameter calculation or the voice activation detector 5.

Other examples could be described that implement, for example, applications associated with automobiles, domestic appliances or multimedia.

As presented in the exemplary embodiments described hereinabove, a system according to the invention allows the various resources needed for speech recognition processing and present at the terminal (for example by downloading) and at the server to be exploited in an optimized processing time and for an optimized result.

What is claimed:

1. A distributed speech recognition method, comprising at least one user terminal and at least one server, capable of communicating with one another via a telecommunications network, wherein, at the user terminal, at least the following steps are performed:
   obtain an audio signal to be recognized;
   calculate modeling parameters for the audio signal to be recognized;
   attempt to associate a stored form with the modeling parameters; and
   independently of the step for attempting to associate a stored form, select a signal from at least the audio signal to be recognized and a signal indicating the modeling parameters, as a function of criteria relating to loading issues of the various processing means at the level of the terminal and of the server, and/or as a function of criteria relating to the availability of voice or data transmission channels;
   sending the selected signal to the server; and
   wherein, at the server, at least the following steps are performed:
   receive the signal transmitted by the user terminal; and
   attempt to associate a stored form with the received signal.

2. The distributed speech recognition method as claimed in claim 1, wherein the signal transmitted by the user terminal to the server is selected from at least the audio signal to be recognized and a signal indicating the modeling parameters;
   wherein, if the received signal is of the audio type, the server calculates modeling parameters for the received audio signal and attempts to associate a stored form with the modeling parameters of the received audio signal; and
   wherein, if the received signal indicates modeling parameters, the server attempts to associate a stored form with said modeling parameters.

3. The method as claimed in claim 2, wherein, when the received signal is of the audio type:
   if the received audio signal is in the form of speech segments extracted after voice detection, the server calculates modeling parameters for the received signal and attempts to associate a stored form with the modeling parameters of the received audio signal;
   otherwise, the server performs a voice activation detection applied to the received audio signal in order to produce an audio signal in the form of speech segments extracted from the received audio signal outside of periods without voice activity, then calculates modeling parameters for the audio signal and attempts to associate a stored form with the modeling parameters.

4. The method as claimed in claim 1, wherein obtaining the signal to be recognized at the terminal comprises a voice activation detection in order to produce the audio signal to be recognized in the form of speech segments extracted from an original audio signal outside of periods without voice activity.

5. The method as claimed in claim 4, wherein the transmitted signal is a signal selected from amongst at least the original audio signal, the audio signal to be recognized in the form of segments extracted after voice detection and the signal indicating the modeling parameters.

6. The method as claimed in claim 1, wherein the associated stored form determined at the terminal is chosen, when this associated form exists.

7. The method as claimed in claim 1 wherein the associated stored form determined the quickest, between the associated stored form determined at the terminal and the associated stored form determined at the server, is chosen.

8. The method as claimed in claim 1 wherein the associated stored form judged best between the associated stored form determined at the terminal and the associated stored for determined at the server, according to a defined selection criterion is chosen.

9. A user terminal adapted for cooperating with a server, comprising:
   means for obtaining an audio signal to be recognized;
   means for calculating modeling parameters for the audio signal; and
   recognition means for associating at least one stored form with modeling parameters calculated by the calculation means; and
   control means for selecting a signal to be transmitted to the server from between the audio signal to be recognized and a signal indicating the modeling parameters calculated, the selecting based on a function of criteria relating to loading issues of the various processing means at the level of the terminal and of the server, and/or on a function of criteria relating to the availability of voice or data transmission channels.

10. The user terminal as claimed in claim 9 wherein the means for obtaining the audio signal to be recognized comprise means for detecting voice activity in order to produce the signal to be recognized in the form of speech segments extracted from an original audio signal, outside of periods without voice activity.

11. The user terminal as claimed in claim 10 wherein the control means are designed to select at least one signal to be transmitted to the server from amongst the original audio signal, the audio signal to be recognized in the form of the speech segments extracted by the voice activation detection means and the signal indicating the calculated modeling parameters.

12. The user terminal as claimed in claim 9 wherein at least one part of the parameter calculation means and of the recognition means is downloaded from the server.

13. The user terminal as claimed in claim 9, comprising means for determining the stored form to be chosen between the stored forms determined at the terminal and at the server, respectively.

* * * * *